(12) United States Patent
Zhou et al.

(10) Patent No.: US 6,417,990 B1
(45) Date of Patent: Jul. 9, 2002

(54) COMPOSITE CORE STRUCTURE FOR HIGH EFFICIENCY WRITER

(75) Inventors: Yuming Zhou, Lakeville; Hao Fang, Savage; Nurul Amin, St. Paul, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 98 days.

(21) Appl. No.: 09/639,700

(22) Filed: Aug. 16, 2000

Related U.S. Application Data
(60) Provisional application No. 60/169,107, filed on Dec. 6, 1999.

(51) Int. Cl.[7] ............................................. G11B 5/147
(52) U.S. Cl. ................................... 360/126; 360/317
(58) Field of Search .................................... 360/126, 317

(56) References Cited

U.S. PATENT DOCUMENTS

| | | | |
|---|---|---|---|
| 4,589,042 A | 5/1986 | Anderson et al. | 360/125 |
| 5,032,945 A | 7/1991 | Argyle et al. | 360/126 |
| 5,224,002 A | 6/1993 | Nakashima et al. | 360/126 |
| 5,388,019 A | 2/1995 | Argyle et al. | 360/126 |
| 5,404,635 A | 4/1995 | Das | 29/603 |
| 5,543,989 A | 8/1996 | Westwood | 360/113 |
| 5,640,753 A | 6/1997 | Schultz et al. | 29/603.08 |
| 5,751,526 A | 5/1998 | Schemmel | 360/113 |
| 5,805,391 A | 9/1998 | Chang et al. | 360/113 |
| 5,812,350 A | 9/1998 | Chen et al. | 360/126 |
| 5,843,521 A | 12/1998 | Ju et al. | 427/129 |
| 5,940,253 A | 8/1999 | Mallary et al. | 360/126 |
| 5,966,800 A | 10/1999 | Huai et al. | 29/603.13 |
| 6,034,847 A | * 3/2000 | Komuro | 360/126 |

OTHER PUBLICATIONS

PP. 97–113 from *Magnetic Disk Drive Technology, Heads, Media, Channel, Interfaces, and Integration*, K.G. Ashar, 1997, published by Institute of Electrical and Electronics Engineers, Inc.

* cited by examiner

*Primary Examiner*—A. J. Heinz
(74) *Attorney, Agent, or Firm*—Kinney & Lange, P.A.

(57) ABSTRACT

A magnetic transducing head having an air bearing surface has a bottom shield, a shared pole, a read element, a substantially planar composite top pole; and a conductive coil. The read element is positioned between the bottom shield and the shared pole. The top pole is formed of high magnetic moment pole tip portion and a high resistivity yoke portion. The pole tip portion of the top pole is substantially coplanar with the yoke portion of the top pole. The pole tip portion of the top pole is separated from the shared pole at the air bearing surface by a write gap, while the yoke portion of the top pole is in contact with the shared pole opposite the air bearing surface. At least a portion of the conductive coil is positioned between the shared pole and the top pole.

14 Claims, 9 Drawing Sheets

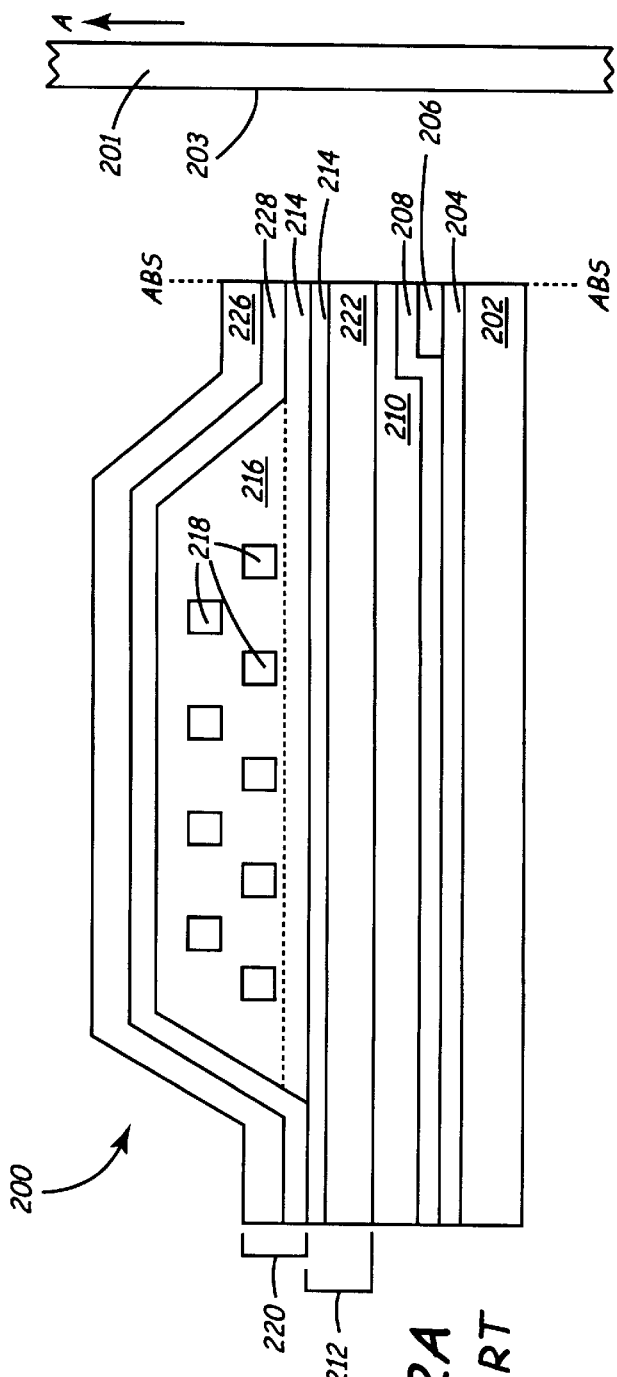
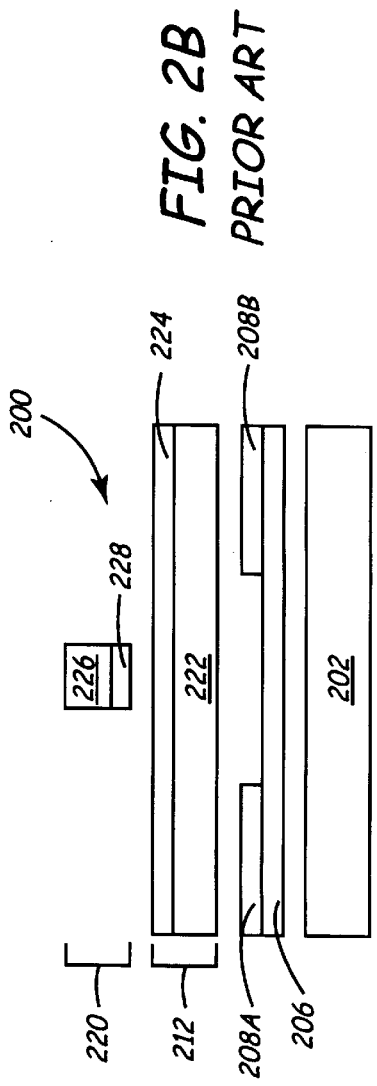
FIG. 2A
PRIOR ART
FIG. 2B
PRIOR ART

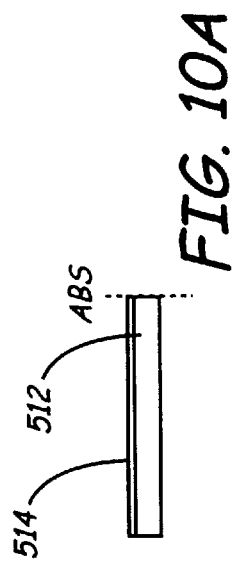
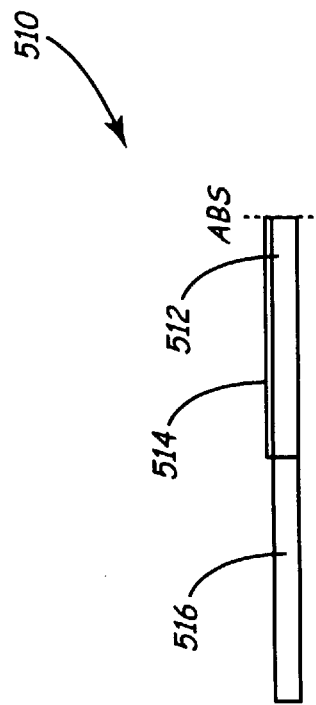
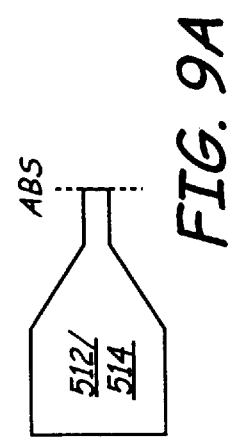
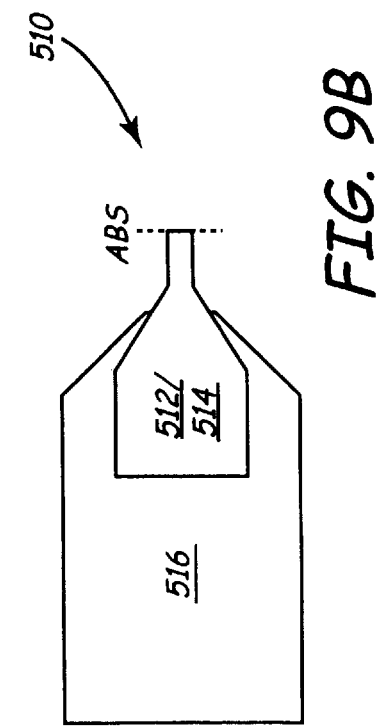

COMPOSITE CORE STRUCTURE FOR HIGH EFFICIENCY WRITER

CROSS-REFERENCE TO RELATED APPLICATION(S)

This Application claims priority from provisional application No. 60/169,107, filed Dec. 6, 1999 for "Composite Core Structure (CCS) for High Efficiency Writer" of Yuming Zhou, Hao Fang and Nural Amin.

BACKGROUND OF THE INVENTION

The present invention relates generally to the field of magnetic data storage and retrieval. In particular, the present invention relates to a high frequency writer having a composite core structure.

A typical magnetic transducing head consists of two portions: a writer portion for storing magnetically-encoded information on a magnetic disc and a reader portion for retrieving that magnetically-encoded information from the disc. The reader typically consists of two shields and a magnetoresistive (MR) sensor positioned between the shields. Magnetic flux from the surface of the disc causes rotation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

The writer typically consists of two magnetic poles, or a magnetic core, separated from each other at an air bearing surface of the write head by a write gap and connected to each other at a region away from the air bearing surface by a back via. Positioned between the two poles are one or more layers of conductive coils encapsulated by insulating layers. The writer and the reader are often arranged in a merged configuration in which a shared pole serves as both a shield in the reader and a magnetic pole in the writer.

To write data to the magnetic media, a time-varying electrical current, or write current, is caused to flow through the conductive coils. The write current produces a time-varying magnetic field in the magnetic poles. The magnetic field bridges the write gap forming a write gap field. The magnetic media is passed over the air bearing surface of the writer at a predetermined distance such that the magnetic surface of the media passes through the gap field. As the write current changes, the write gap field changes in intensity and direction.

Recent years have seen considerable demand for ever increasing data storage densities. Generally, the data storage capacity of a magnetic data storage and retrieval device is increased through use of a magnetic media supporting an increased areal density, which is the number of units of data stored in a unit area of the media. Areal density is determined by two components of the magnetic media: the track density (the number of data tracks per unit width of the magnetic media) and the linear density (the number of units of data stored per unit length of a data track). To increase the areal density of a magnetic media, one must increase the linear density and/or the track density of the magnetic media.

Increases in areal density have been achieved by increasing the strength of the write gap field, decreasing the thickness of the gap between the magnetic poles at the air bearing surface, decreasing the width of the writer poles at the air bearing surface and increasing the coercivity of the magnetic media. These improvements require the magnetic core be formed of a high magnetic moment material.

Recent years have also seen considerable demand for ever increasing data rates. Generally, the data rate of a writer is increased by minimizing the occurrence of eddy currents through the magnetic core. Eddy currents are induced through the magnetic core each time the write gap field changes directions. These eddy currents, which are a counteracting flow of current to the change in direction of the write gap field, have a negative effect on the performance of the transducing head. First, the eddy currents act as a shield to prevent external fields from penetrating the magnetic core, thereby reducing the efficiency of the transducing head. Second, the increased eddy currents increase the time required to reverse the direction of magnetic flux through the magnetic core, thereby negatively impacting the data rate of the writer.

Eddy current effects can be reduced by increasing the resistivity of the material forming the magnetic core. Higher resistivity materials, however, generally have lower saturation moments; but, as discussed above, higher magnetic moment materials are needed to achieve higher data storage densities.

Eddy current effects can also be reduced by forming the core of horizontal laminations of thin films which alternate between thin films of traditional core materials and thin films of electrically insulating materials. However, the choice of a lamination for the core will increase manufacturing costs since sputtering, rather than plating, technology generally must be employed for the deposit of traditional core materials on electrically insulating materials. Additionally, the use of a laminate core will necessarily have a reduced magnetic moment, and consequently, a lower data storage density.

Since it is difficult to find a material having both a high magnetic moment and a high resistivity, more recent prior art writers have used multiple materials to lend both these properties to the writer. One such prior art approach is to form the magnetic core of two layers, one of which is formed of a high magnetic moment material and the other of which is formed of a high resistivity material. But, the use of a multi-layer core will necessarily reduce the overall magnetic moment over that possible with a writer formed of solely the high magnetic moment material.

A second prior art approach is to form a top pole of the magnetic core of two pieces: one of a high magnetic moment material and a second of a high resistivity material. This "two piece pole" (TPP) design originated from the need to build the pole tip separately from the pole yoke due to photo-processing concerns. Additionally, a bottom pole of the magnetic core may be a recessed pole similarly formed of two pieces. In the case in which both the top and bottom pole are formed of two pieces, the build process of the writer would progress as follows: A planar second bottom pole piece would be deposited; a planar first bottom pole piece would be deposited on a portion of the second bottom pole piece; a write gap layer would be deposited over an exposed portion of the second bottom pole piece and the first bottom pole piece, a planar first top pole piece would be deposited over the write gap layer; a tri-layer stack formed of the first bottom pole piece, the write gap layer, and the first top pole piece would be shaped to define a pole tip region; insulating layers and coils would be deposited; and finally, a second top pole piece would be deposited over the first top pole piece, as well as the insulating layers and coils.

This build process is necessary because the first bottom pole piece and the second bottom pole piece need to be built on a flat surface to allow for proper shaping of the pole tips. Thus, the existing TPP structures all require stacking the first pole piece on the second pole piece, which is inefficient for flux transportation.

Accordingly, there is need for a high efficiency writer core capable of both high magnetic data storage densities and data rates.

BRIEF SUMMARY OF THE INVENTION

The present invention is a high efficiency recording head having a composite core which enables the writer to produce increased write gap fields while minimizing eddy current therein, thus enabling the writer to have increased data storage densities and data rates.

A magnetic transducing head of the present invention has a bottom shield, a shared pole, a read element, a substantially planar composite top pole; and a conductive coil. The read element is positioned between the bottom shield and the shared pole. The top pole is formed of high magnetic moment pole tip portion and a high resistivity yoke portion. The pole tip portion of the top pole is substantially coplanar with the yoke portion of the top pole. The pole tip portion of the top pole is separated from the shared pole at an air bearing surface of the transducing head by a write gap, while the yoke portion of the top pole is in contact with the shared pole opposite the air bearing surface. At least a portion of the conductive coil is positioned between the shared pole and the top pole.

In a preferred embodiment of the present invention, the shared pole of the magnetic transducing head is a multi-part structure formed of a substantially planar yoke portion, a pole tip portion positioned on the yoke portion adjacent the air bearing surface and a back via portion positioned on the yoke portion opposite the air bearing surface such that a U-shaped cavity is formed above the yoke portion between the pole tip and the back via portions. A thickness of the back via portion is preferably greater than a thickness of the pole tip portion so that the back via portion is in contact with the top pole while the pole tip portion is separated from the top pole by the write gap.

BRIEF DESCRIPTION OF THE DRAWINGS

FIG. 2A is a cross-sectional view of a prior art transducing head taken along a plane normal to an air bearing surface of the transducing head.

FIG. 2B is a layered diagram that illustrates the location of a plurality of magnetically significant elements of the transducing head of FIG. 2A as they appear along the ABS of the transducing head.

FIGS. 7A–7C are top views, while

FIGS. 9A and 9B are top views, while

FIGS. 10A and 10B are cross-sectional views, illustrating a second method of forming a composite core.

DETAILED DESCRIPTION

Figure 1A:
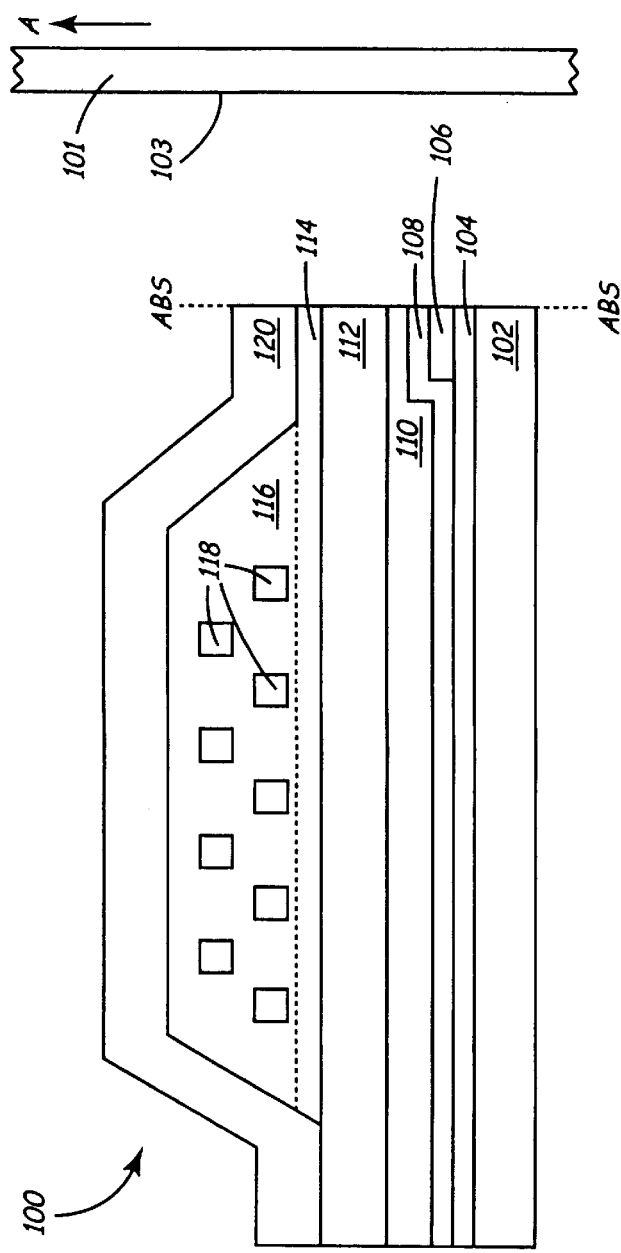
FIG. 1A is a cross-sectional view of a prior art transducing head taken along a plane normal to an air bearing surface of the transducing head.

FIG. 1A is a cross-sectional view of prior art transducing head 100 and magnetic disc 101 taken along a plane normal to an air bearing surface (ABS) of transducing head 100. The ABS of transducing head 100 faces disc surface 103 of magnetic disc 101. Magnetic disc 101 travels or rotates in a direction relative to transducing head 100 as indicated by arrow A. Spacing between the ABS of transducing head 100 and disc surface 103 is preferably minimized while avoiding contact between transducing head 100 and magnetic disc 101.

Figure 1B:
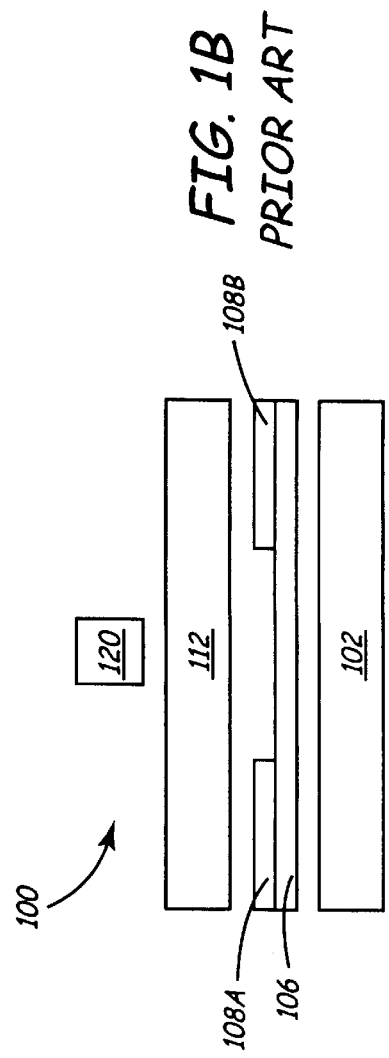
FIG. 1B is a layered diagram that illustrates the location of a plurality of magnetically significant elements of the transducing head of FIG. 1A as they appear along the ABS of the transducing head.

FIG. 1B is a layered diagram that illustrates the location of a plurality of magnetically significant elements of transducing head 100 as they appear along the ABS of transducing head 100. For clarity, all spacing and insulating layers are omitted from FIG. 1B.

Magnetic transducing head 100 includes a reader portion and a writer portion. The reader portion includes bottom shield 102, first half gap 104, read element 106, metal contact layer 108, second half gap 110 and top shield 112. Read element 106 is positioned adjacent the ABS between bottom shield 102 and top shield 112. More specifically, read element 106 is positioned between terminating ends of first half gap 110 and metal contact layer 108. Metal contact layer 108 is positioned between first half gap 104 and second half gap 110. Read element 106 has two passive regions defined as the portions of read element 106 positioned adjacent to metal contacts 108A and 108B. An active region of read element 106 is defined as the portion of read element 106 located between the two passive regions of read element 106. The active region of read element 106 defines a read sensor width.

Typically, read element 106 is a magnetoresistive (MR) sensor. In operation of transducing head 100, magnetic flux from disc surface 103 of disc 101 causes rotation of the magnetization vector of a sensing layer of MR sensor 106, which in turn causes a change in electrical resistivity of MR sensor 106. This change in resistivity of MR sensor 106 can be detected by passing a current through MR sensor 106 via metal contact layer 108 and measuring a voltage across MR sensor 106. External circuitry then converts the voltage information into an appropriate format and manipulates that information as necessary.

The writer portion of transducing head 100 includes bottom pole 112, write gap layer 114, insulating layers 116, conductive coils 118 and top pole 120. Top pole 120 and bottom pole 112 are separated from each other at the ABS of transducing head 100 by write gap layer 114, and are connected to each other at a region away from the ABS by a back via portion of top pole 120. Electrically conductive coils 118, which are held in place between top pole 120 and bottom pole 112 by use of write gap layer 114 and insulating layers 116, are provided to generate magnetic fields across the write gap.

The writer and reader portions of transducing head 100 are often arranged in a merged configuration, as shown in FIGS. 1A and 1B, in which shared pole 112 functions as both top shield 112 for the reader portion and as bottom pole 112 for the writer portion. The writer and reader portions of transducing head 100 may also be arranged in a piggyback configuration in which top shield 112 and bottom pole 112 would be two separate layers separated by an insulating layer.

Conductive coils 118 are shown in FIG. 1A as two layers of coils but may also be formed of more or less layers of coils as is well known in the field of magnetic read/write head design.

To write data to a magnetic medium, such as magnetic disc 101, a time-varying electrical current, or write current, is caused to flow through conductive coils 118. The magnetic field bridges the write gap forming a write gap field. The magnetic disc is passed over the ABS of magnetic recording head 100 at a predetermined distance such that the magnetic surface 103 of disc 101 passes through the gap field. As the write current changes, the write gap field changes in intensity and direction.

Recent years have seen considerable demand for ever increasing data storage densities. Generally, increased data storage capacity of a magnetic data storage and retrieval device is achieved by increasing the strength of the write gap field, decreasing the thickness of the gap between the magnetic poles at the air bearing surface, decreasing the width of the writer poles at the air bearing surface and increasing the coercivity of the magnetic media. These improvements require the magnetic core be formed of a high magnetic moment material.

Recent years have also seen considerable demand for ever increasing data rates. Generally, the data rate of a writer is increased by minimizing the occurrence of eddy currents through the magnetic core. Eddy currents are induced through the magnetic core each time the write gap field changes directions. These eddy currents, which are a counteracting flow of current to the change in direction of the write gap field, have a negative effect on the performance of the transducing head. Typically, eddy current effects can be minimized by increasing the resistivity of the material forming the magnetic core. Higher resistivity materials, however, generally have lower saturation moments; and, as discussed above, higher magnetic moment materials are needed to achieve higher data storage densities.

FIG. 2A is a cross-sectional view of prior art transducing head 200 and magnetic disc 201 taken along a plane normal to an air bearing surface (ABS) of transducing head 200. The ABS of transducing head 200 faces disc surface 203 of magnetic disc 201. Magnetic disc 201 travels or rotates in a direction relative to transducing head 200 as indicated by arrow A. Spacing between the ABS of transducing head 200 and disc surface 203 is preferably minimized while avoiding contact between transducing head 200 and magnetic disc 201.

FIG. 2B is a layered diagram that illustrates the location of a plurality of magnetically significant elements of transducing head 200 as they appear along the ABS of transducing head 200. For clarity, all spacing and insulating layers are omitted from FIG. 2B.

Magnetic transducing head 200 includes a reader portion and a writer portion. The reader portion includes bottom shield 202, first half gap 204, read element 206, metal contact layer 208, second half gap 210 and top shield 212. Read element 206 is positioned adjacent the ABS between bottom shield 202 and top shield 212. More specifically, read element 206 is positioned between terminating ends of first half gap 210 and metal contact layer 208. Metal contact layer 208 is positioned between first half gap 204 and second half gap 210. Read element 206 has two passive regions defined as the portions of read element 206 positioned adjacent to metal contacts 208A and 208B. An active region of read element 206 is defined as the portion of read element 206 located between the two passive regions of read element 206. The active region of read element 206 defines a read sensor width.

Typically, read element 206 is a magnetoresistive (MR) sensor. In operation of transducing head 200, magnetic flux from disc surface 203 of disc 201 causes rotation of the magnetization vector of a sensing layer of MR sensor 206, which in turn causes a change in electrical resistivity of MR sensor 206. This change in resistivity of MR sensor 206 can be detected bypassing a current through MR sensor 206 via metal contact layer 208 and measuring a voltage across MR sensor 206. External circuitry then converts the voltage information into an appropriate format and manipulates that information as necessary.

The writer portion of transducing head 200 includes bottom pole 212, write gap layer 214, insulating layers 216, conductive coils 218 and top pole 220. Top pole 220 and bottom pole 212 are separated from each other at the ABS of transducing head 200 by write gap layer 214, and are connected to each other at a region away from the ABS by a back via portion of top pole 220. Electrically conductive coils 218, which are held in place between top pole 220 and bottom pole 212 by use of write gap layer 214 and insulating layers 216, are provided to generate magnetic fields across the write gap.

The writer and reader portions of transducing head 200 are often arranged in a merged configuration, as shown in FIGS. 2A and 2B, in which shared pole 212 functions as both top shield 212 for the reader portion and as bottom pole 212 for the writer portion. The writer and reader portions of transducing head 200 may also be arranged in a piggyback configuration in which top shield 212 and bottom pole 212 would be two separate layers separated by an insulating layer.

Conductive coils 218 are shown in FIG. 2A as two layers of coils but may also be formed of more or less layers of coils as is well known in the field of magnetic read/write head design.

To write data to a magnetic medium, such as magnetic disc 201, a time-varying electrical current, or write current, is caused to flow through conductive coils 218. The magnetic field bridges the write gap forming a write gap field. The magnetic disc is passed over the ABS of magnetic recording head 200 at a predetermined distance such that the magnetic surface 203 of disc 201 passes through the gap field. As the write current changes, the write gap field changes in intensity and direction.

The prior art writer of transducing head 200 attempts to solve the deficiencies of the prior art writer of transducing head 100 by forming each of top pole 220 and shared pole 212 of two layers: one with a high magnetic moment material to increase the strength of the write gap field and the other with a high resistivity material to minimize eddy currents. Thus, shared pole 212 is formed of high resistivity layer 222 and high magnetic moment layer 224, and top pole 220 is formed of high resistivity layer 226 and high magnetic moment layer 228.

This solution, while an improvement over the writer of transducing head 100, is still lacking. The lower magnetic moment of high resistivity layers 222 and 226 will lower the potential strength of the write gap field, thereby reducing the potential data storage density. Additionally, the lower resistivity of high magnetic moment layers 224 and 228 will increase eddy current effects in those layers, thereby decreasing the potential data rate.

Figure 3A:
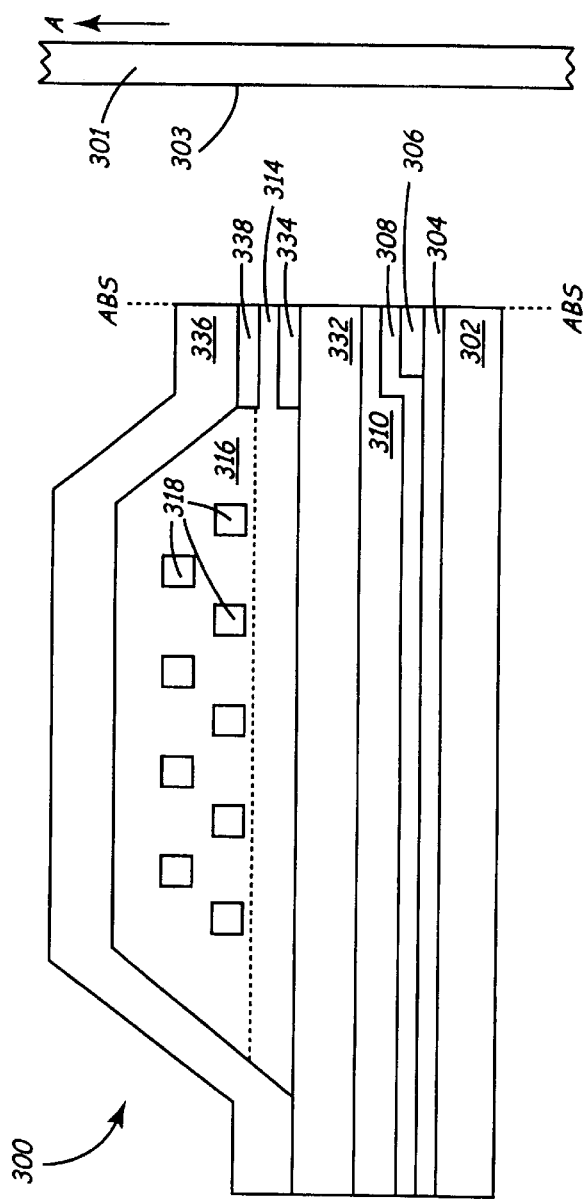
FIG. 3A is a cross-sectional view of a prior art transducing head taken along a plane normal to an air bearing surface of the transducing head.

FIG. 3A is a cross-sectional view of prior art transducing head 300 and magnetic disc 301 taken along a plane normal to an air bearing surface (ABS) of transducing head 300. The ABS of transducing head 300 faces disc surface 303 of magnetic disc 301. Magnetic disc 301 travels or rotates in a direction relative to transducing head 300 as indicated by arrow A. Spacing between the ABS of transducing head 300 and disc surface 303 is preferably minimized while avoiding contact between transducing head 300 and magnetic disc 301.

Figure 3B:
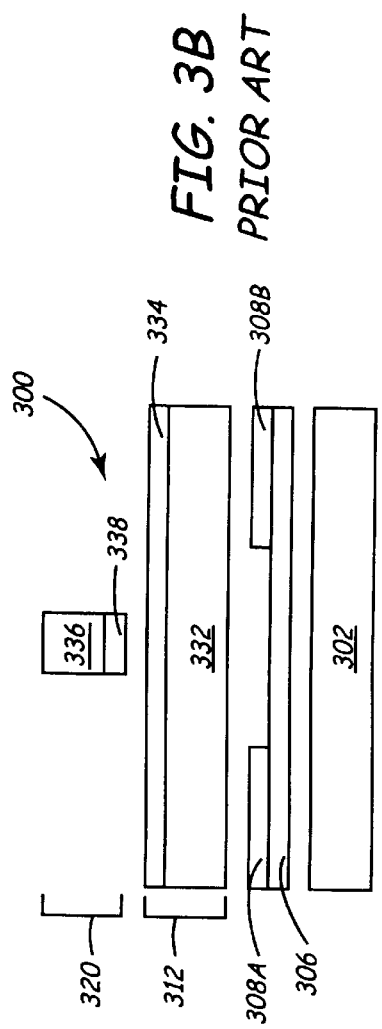
FIG. 3B is a layered diagram that illustrates the location of a plurality of magnetically significant elements of the transducing head of FIG. 3A as they appear along the ABS of the transducing head.

FIG. 3B is a layered diagram that illustrates the location of a plurality of magnetically significant elements of transducing head 300 as they appear along the ABS of transducing head 300. For clarity, all spacing and insulating layers are omitted from FIG. 3B.

Magnetic transducing head 300 includes a reader portion and a writer portion. The reader portion includes bottom shield 302, first half gap 304, read element 306, metal contact layer 308, second half gap 310 and top shield 312. Read element 306 is positioned adjacent the ABS between bottom shield 302 and top shield 312. More specifically, read element 306 is positioned between terminating ends of first half gap 310 and metal contact layer 308. Metal contact layer 308 is positioned between first half gap 304 and second half gap 310. Read element 306 has two passive regions defined as the portions of read element 306 positioned adjacent to metal contacts 308A and 308B. An active region of read element 306 is defined as the portion of read element 306 located between the two passive regions of read element 306. The active region of read element 306 defines a read sensor width.

Typically, read element 306 is a magnetoresistive (MR) sensor. In operation of transducing head 300, magnetic flux from disc surface 303 of disc 301 causes rotation of the magnetization vector of a sensing layer of MR sensor 306, which in turn causes a change in electrical resistivity of MR sensor 306. This change in resistivity of MR sensor 306 can be detected by passing a current through MR sensor 306 via metal contact layer 308 and measuring a voltage across MR sensor 306. External circuitry then converts the voltage information into an appropriate format and manipulates that information as necessary.

The writer portion of transducing head 300 includes bottom pole 312, write gap layer 314, insulating layers 316, conductive coils 318 and top pole 320. Top pole 320 and bottom pole 312 are separated from each other at the ABS of transducing head 300 by write gap layer 314, and are connected to each other at a region away from the ABS by a back via portion of top pole 320. Electrically conductive coils 318, which are held in place between top pole 320 and bottom pole 312 by use of write gap layer 314 and insulating layers 316, are provided to generate magnetic fields across the write gap.

The writer and reader portions of transducing head 300 are often arranged in a merged configuration, as shown in FIGS. 3A and 3B, in which shared pole 312 functions as both top shield 312 for the reader portion and as bottom pole 312 for the writer portion. The writer and reader portions of transducing head 300 may also be arranged in a piggyback configuration in which top shield 312 and bottom pole 312 would be two separate layers separated by an insulating layer.

Conductive coils 318 are shown in FIG. 3A as two layers of coils but may also be formed of more or less layers of coils as is well known in the field of magnetic read/write head design.

To write data to a magnetic medium, such as magnetic disc 301, a time-varying electrical current, or write current, is caused to flow through conductive coils 318. The magnetic field bridges the write gap forming a write gap field. The magnetic disc is passed over the ABS of magnetic recording head 300 at a predetermined distance such that the magnetic surface 303 of disc 301 passes through the gap field. As the write current changes, the write gap field changes in intensity and direction.

The structure of the prior art writer of transducing head 300 was originally developed to solve the photo-processing fabrication need to separately build the pole tip portion of the writer. Later, it was recognized as a possible solution to solve the deficiencies of the prior art writers of transducing heads 100 and 200. The writer of transducing head 300 uses a high magnetic moment material near the pole tip regions of top pole 320 and shared pole 312 to increase the strength of the write gap field. Thus, each of top pole 320 and shared pole 312 is formed of a first and a second piece. Shared pole 312 has second pole piece 332 and first pole piece 334, and top pole 320 has second pole piece 336 and 338. Second pole pieces 332 and 336 of respective shared and top poles 312 and 320 are formed of high resistivity materials, while first pole pieces 334 and 338 are formed of high magnetic moment materials. During fabrication of transducing head 300, a tri-layer stack is formed of first pole piece 334 of shared pole 312, write gap layer 314, and first pole piece 338 of top pole 320. This tri-layer stack is then simultaneously shaped to form a pole tip region of transducing head 300.

The writer of transducing head 300 will have reduced eddy currents in second pole pieces 332 and 336 of respective shared and top poles 312 and 320 since that region of the poles is formed exclusively of a high resistivity material. However, the lower magnetic moment of first pole pieces 334 and 338 of respective shared and top poles 312 and 320 will lower the potential strength of the write gap field. Additionally, the stacking of second pole piece 336 of top pole 320 over first pole piece 338 of top pole 320 is inefficient in transporting flux since this arrangement allows for excess flux leakage, as well as an elongated flux path.

Figure 4A:
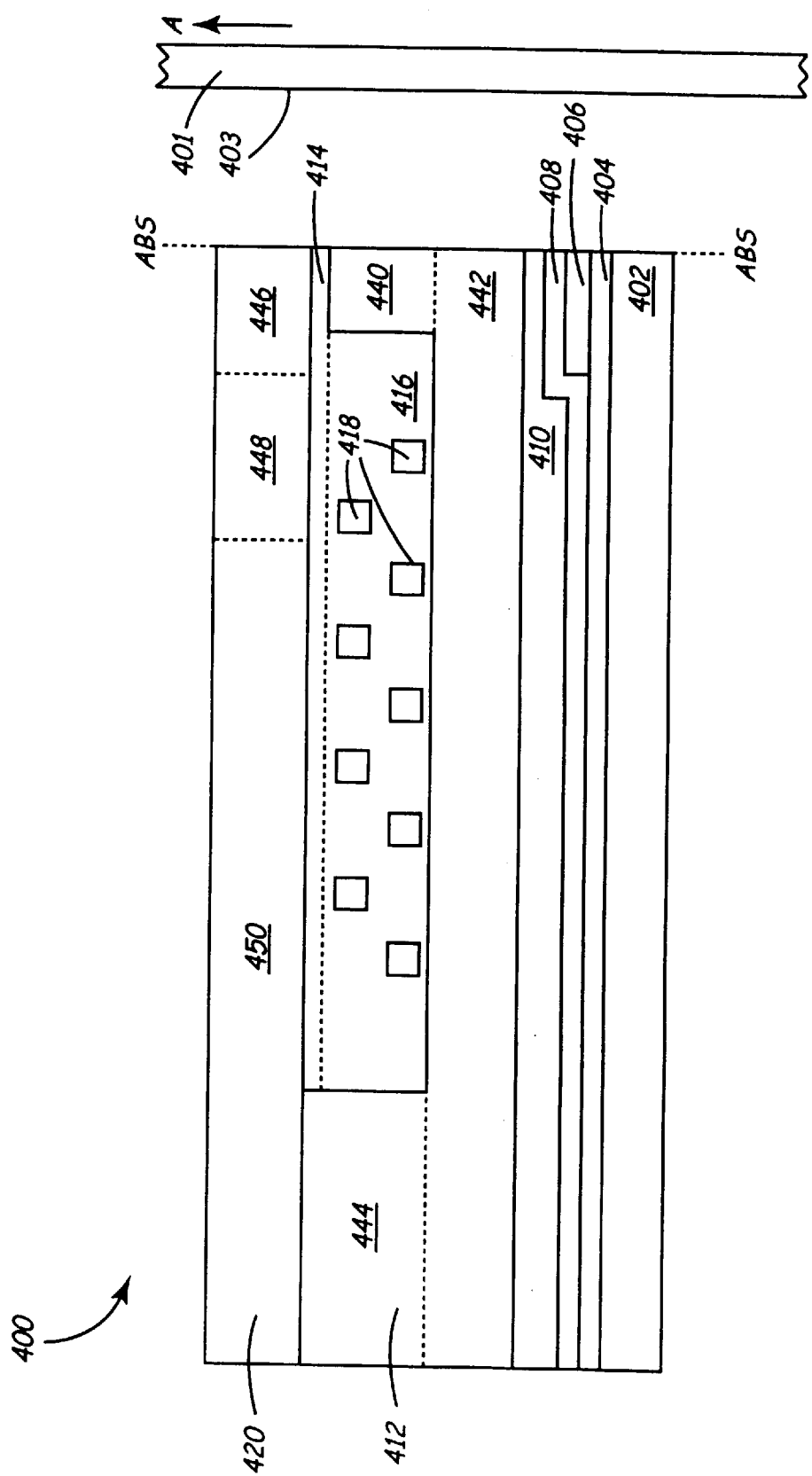
FIG. 4A is a cross-sectional view of a transducing head having a composite core in accord with the present invention, the cross-sectional view being taken along a plane normal to an air bearing surface of the transducing head.
Figure 4B:
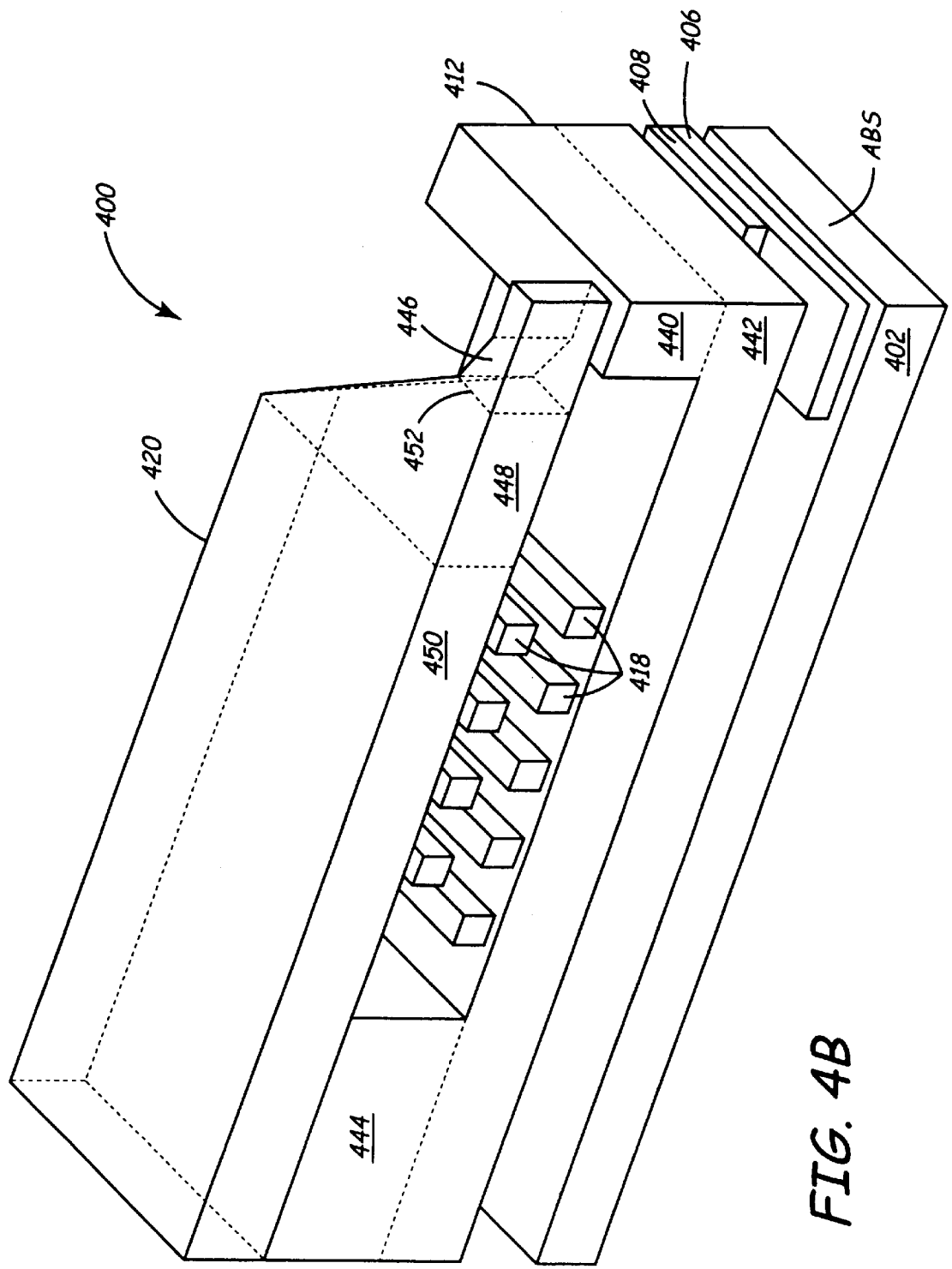
FIG. 4B is perspective view of the transducing head of FIG. 4A.

FIG. 4A is a cross-sectional view of transducing head 400 having a composite core in accord with the present invention, the cross-sectional view being taken along a plane normal to an air bearing surface ABS of transducing head 400. FIG. 4B is perspective view of transducing head 400, in which all spacing and insulating layers have been omitted for clarity.

The ABS of transducing head 400 faces disc surface 403 of magnetic disc 401. Magnetic disc 401 travels or rotates in a direction relative to transducing head 400 as indicated by arrow A. Spacing between the ABS of transducing head 400 and disc surface 403 is preferably minimized while avoiding contact between transducing head 400 and magnetic disc 401.

Magnetic transducing head 400, which has a composite core structure, includes a reader portion and a writer portion. The reader portion includes bottom shield 402, first half gap 404, read element 406, metal contact layer 408, second half gap 410 and top shield 412. Read element 406 is positioned adjacent the ABS between bottom shield 402 and top shield 412. More specifically, read element 406 is positioned between terminating ends of first half gap 410 and metal contact layer 408. Metal contact layer 408 is positioned between first half gap 404 and second half gap 410. Read element 406 has two passive regions defined as the portions of read element 406 positioned adjacent to metal contacts 408. An active region of read element 406 is defined as the portion of read element 406 located between the two passive regions of read element 406. The active region of read element 406 defines a read sensor width.

Typically, read element 406 is a magnetoresistive (MR) sensor. In operation of transducing head 400, magnetic flux from disc surface 403 of disc 401 causes rotation of the magnetization vector of a sensing layer of MR sensor 406, which in turn causes a change in electrical resistivity of MR sensor 406. This change in resistivity of MR sensor 406 can be detected by passing a current through MR sensor 406 via metal contact layer 408 and measuring a voltage across MR sensor 406. External circuitry then converts the voltage information into an appropriate format and manipulates that information as necessary.

The writer portion of transducing head 400 includes bottom pole 412, write gap layer 414, insulating layers 416, conductive coils 418 and top pole 420. Top pole 420 and bottom pole 412 are separated from each other at the ABS of transducing head 400 by write gap layer 414, and are connected to each other at a region away from the ABS by a back via portion of bottom pole 412. Electrically conductive coils 418, which are held in place between top pole 420 and bottom pole 412 by use of write gap layer 414 and insulating layers 416, are provided to generate magnetic fields across the write gap.

The writer and reader portions of transducing head 400 are often arranged in a merged configuration, as shown in FIGS. 4A and 4B, in which shared pole 412 functions as both top shield 412 for the reader portion and as bottom pole 412 for the writer portion. The writer and reader portions of transducing head 400 may also be arranged in a piggyback configuration in which top shield 412 and bottom pole 412 would be two separate layers separated by an insulating layer.

Although transducing head 400 is shown with both a reader and a writer portion, a transducing head in accord with the present invention could be formed without the reader portion.

Conductive coils 418 are shown in FIG. 4A as two layers of coils but may also be formed of more or less layers of coils as is well known in the field of magnetic read/write head design.

To write data to a magnetic medium, such as magnetic disc 401, a time-varying electrical current, or write current, is caused to flow through conductive coils 418. The magnetic field bridges the write gap forming a write gap field. The magnetic disc is passed over the ABS of magnetic recording head 400 at a predetermined distance such that the magnetic surface 403 of disc 401 passes through the gap field. As the write current changes, the write gap field changes in intensity and direction.

Shared pole 412 is a recessed structure in which at least a portion of conductive coils 418 can be positioned, thereby allowing for top pole 420 to be substantially planar. The recess in shared pole 412 is formed by fabricating shared pole 412 as a multi-part structure having front portion 440, planar portion 442 and back via portion 444. Yoke portion 442 is a substantially planar layer over which front portion 440 and back via portion 444 can be deposited. Front portion 440 is deposited over yoke portion 442 adjacent the ABS, while back via portion 444 is deposited over yoke portion 442 opposite the ABS, thereby forming a U-shaped recess above yoke portion 442 between front portion 440 and back via portion 444. A height of back via portion 444 is greater than a height of front portion 440 to allow for back via portion 444 to directly contact top pole 420 and for front portion 440 to be separated from top pole 420 by write gap layer 414.

Composite top pole 420 is a substantially planar composite layer formed of pole tip portion 446 adjacent the ABS, yoke portion 450 opposite the ABS and neck portion 448 positioned between pole tip portion 446 and yoke portion 450. Pole tip portion 446 is formed of a high magnetic moment material, while each of neck portion 448 and yoke portion 450 are formed of a high resistivity material. Due the inability to locate suitable materials having both a high resistivity and a high magnetic moment, the high magnetic moment material used to form pole tip portion 446 will necessarily have a lower resistivity and higher magnetic moment that the material(s) used to form each of neck portion 448 and yoke portion 450.

Composite top pole 420 is tapered near the ABS to define a track width of data written to disc 401. Thus, a width of pole tip portion 446 is substantially less than a width of yoke portion 450, and a width of neck portion 448 tapers from the width of pole tip portion 446 to the width of yoke portion 450.

Figure 5:
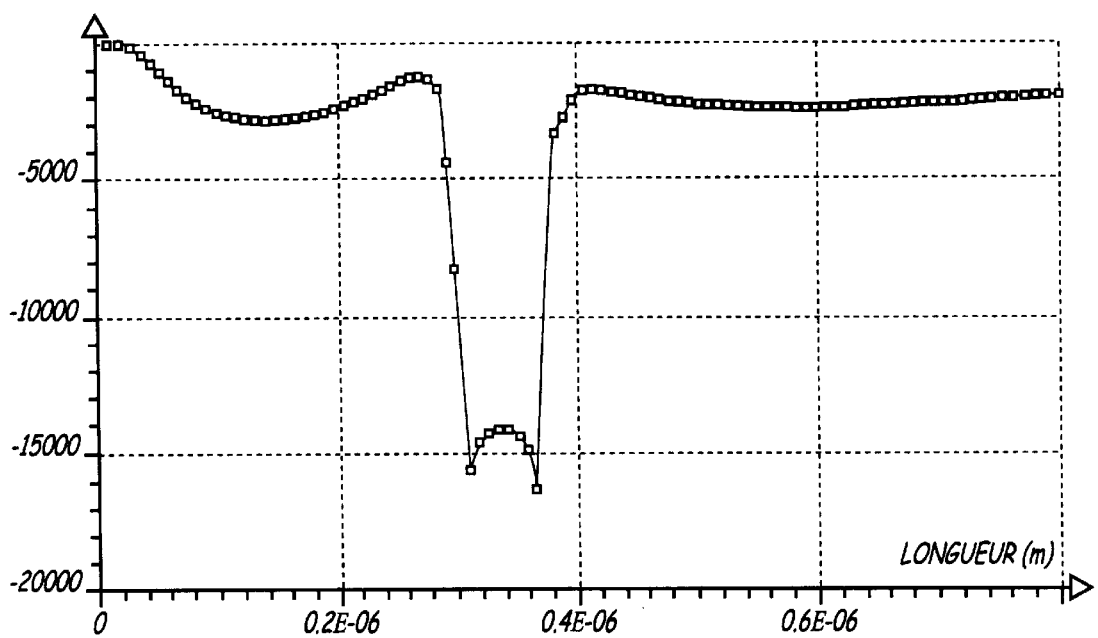
FIG. 5 is a graph illustrating write gap field strength at an air bearing surface of a composite core writer in accord with the present invention.

The composite core writer of transducing head 400 offers significant improvements in writer efficiency over the prior art writers of transducing heads 100, 200 and 300. Most importantly, the composite core writer will ensure both greater potential areal density (due to a higher write gap field strength) and better frequency performance (due to fewer eddy current effects) of the writer over prior art writers. FIG. 5 is a graph illustrating write gap field strength at an air bearing surface of a composite core writer in accord with the present invention. As shown in FIG. 5, the composite core writer having a pole tip portion formed of a material having a magnetic moment of 2.2 Tesla and a yoke portion formed of a material having a magnetic moment of 1.6 Tesla is capable of generating a magnetic write gap field in excess of 14 KOe.

Another advantage of the composite core writer of transducing head 400 is that the planar shape of composite top pole 420 allows for greater control over the width of pole tip portion 446 at the ABS, thereby allowing for greater control of a track width of the data written to the magnetic media. Additionally, the planar shape of composite top pole 420 allows for a reduction in core height and length, thereby increasing the efficiency of the writer due to a shortened flux path.

Figure 6:
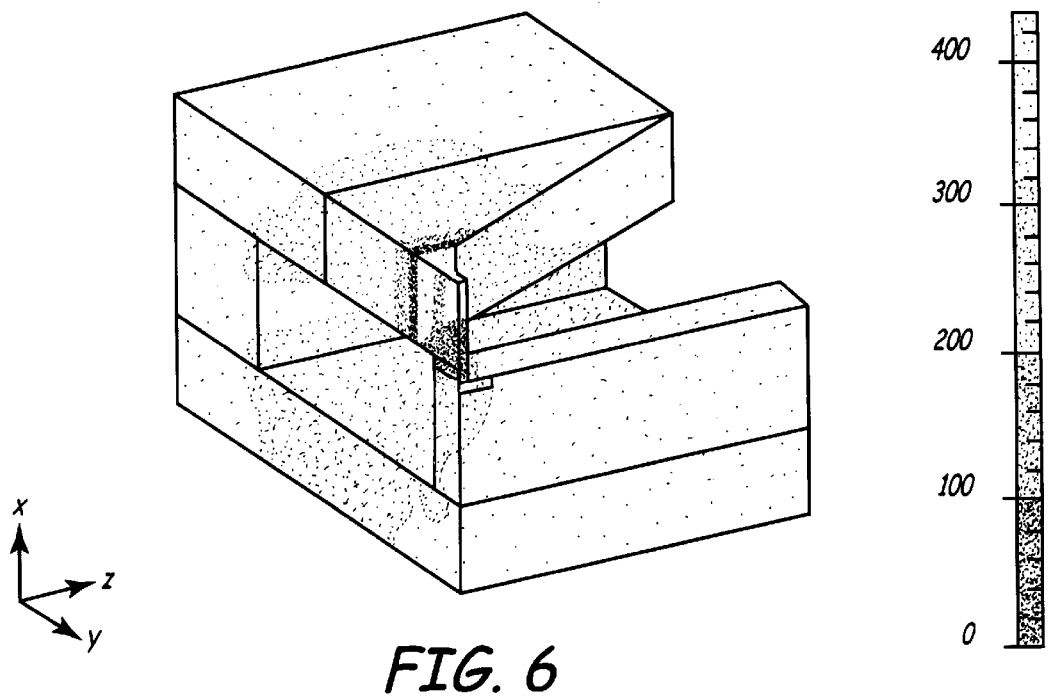
FIG. 6 is a permeability plot illustrating magnetic flux density in a composite core in accord with the present invention.

Moreover, since composite top pole 420 is formed of at least two materials having differing magnetic moments, interface 452 between the differing materials (e.g., between pole tip portion 446 and neck portion 448) will act like a flux regulating break point, and due to the flat topology, interface 452 dimensions can be easily controlled through use of existing processes. FIG. 6 is a permeability plot illustrating magnetic flux density in a composite core in accord with the present invention. The dark regions illustrated in FIG. 6 are regions which are more heavily saturated. As expected, the magnetic core is heavily saturated at a write gap between a top pole and a shared pole of the composite core. Additionally, the magnetic core is heavily saturated at interface between a pole tip portion and a neck portion of the top pole, illustrating that the interface does in fact act as a flux regulating break point.

Figure 7A:
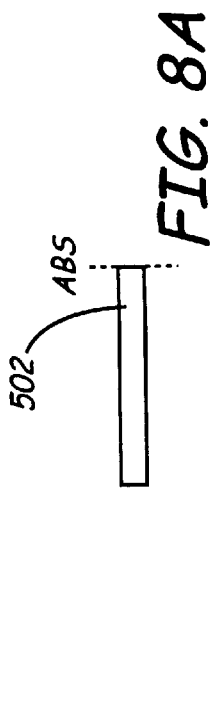
Figure 7B:
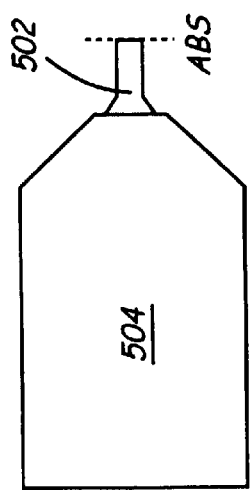
Figure 7C:
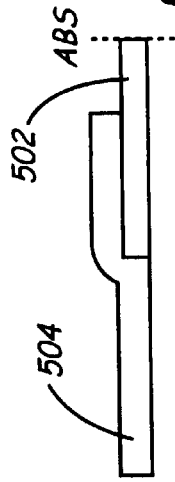
Figure 8A:
FIGS. 8A–8C are cross-sectional views, illustrating a first method of forming a composite pole.
Figure 8B:
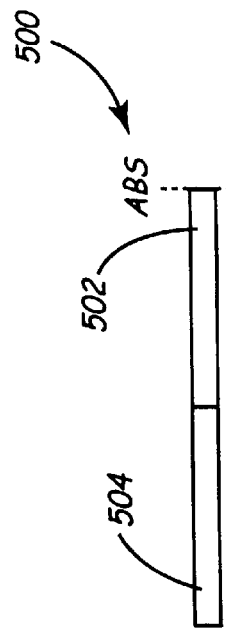
Figure 8C:
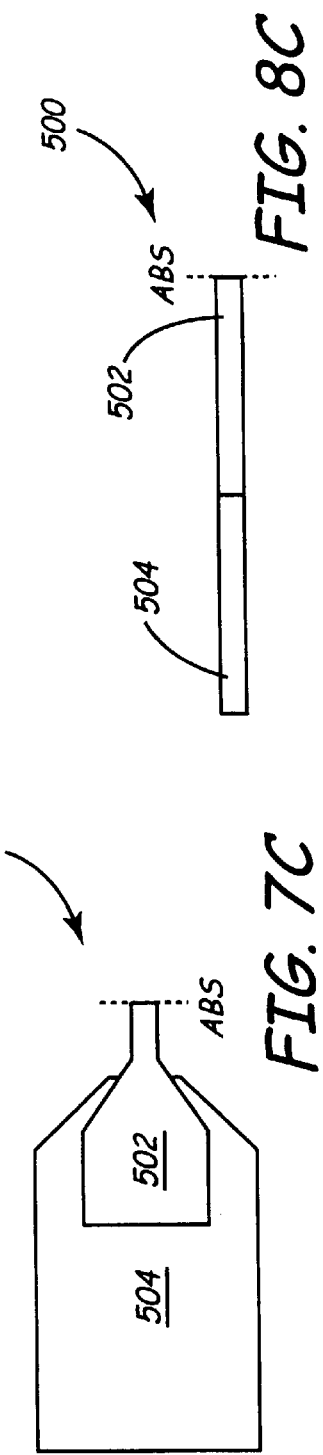

The composite core writer of the present invention can be built using several conventional processing steps. For instance, FIGS. 7A–7C are top views, while FIGS. 8A–8C are cross-sectional views, illustrating a first method of forming composite pole 500. This first method may include the following steps:

(1) As shown in FIGS. 7A and 8A, define pole tip portion 502 by depositing a seed layer, depositing a first mask on the seed layer, plating a pole tip structure over the unmasked seed layer, and removing the first mask;

(2) As shown in FIGS. 7B and 8B, define yoke portion 504 on pole tip portion 502 by depositing a second mask on pole tip portion 502 and the exposed seed layer, plating a yoke structure on the unmasked pole tip portion and exposed seed layer, removing the second mask, and etching any uncovered seed layer; and (3) As shown in FIGS. 7C and 8C, planarize the composite structure to yield composite core 500.

FIGS. 9A and 9B are top views, while FIGS. 10A and 10B are cross-sectional views, illustrating a second method of forming a composite core 510. This second method may be implemented using the following steps:

(1) As shown in FIGS. 9A and 10A, define pole tip portion 512 by depositing a seed layer, depositing a mask on the seed layer, plating a pole tip structure over the unmasked seed layer, depositing thin insulator layer 514 over pole tip portion 512, and removing the mask; and (2) As shown in FIGS. 9B and 10B, define yoke portion 516 by depositing a mask, plating a yoke structure on the unmasked exposed seed layer (the yoke structure will not plate on pole tip portion 512 due to thin insulator layer 514), removing the second mask, and etching any uncovered seed layer.

Figure 11A:
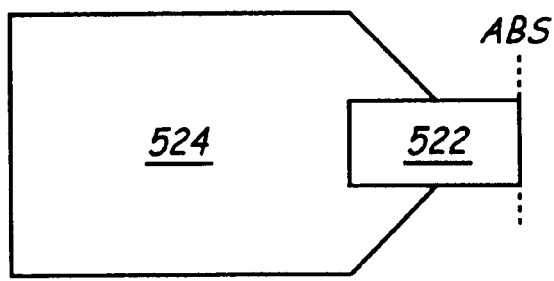
FIGS. 11A–11D are top views illustrating a third method of forming a composite core.
Figure 11B:
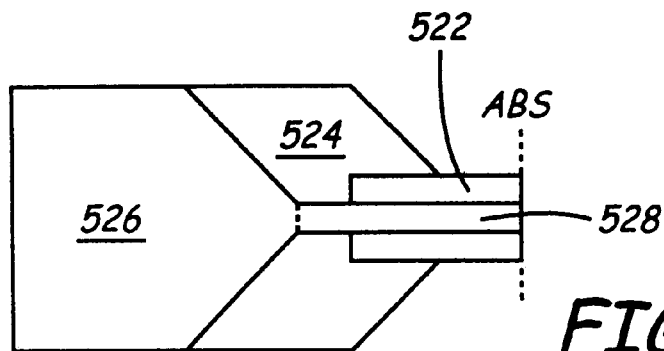
Figure 11C:
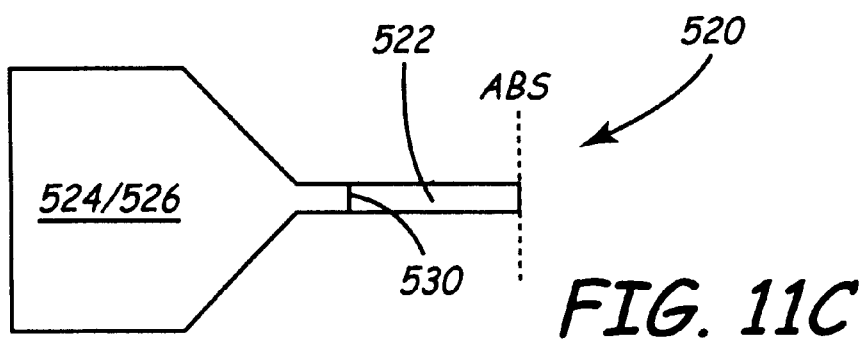
Figure 11D:
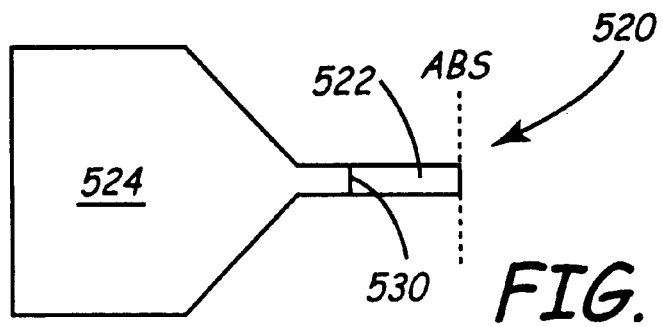

FIGS. 11A–11D are top views illustrating a third method of forming a composite core 520. This third method takes advantage of conventional processes to define a location of flux regulating interface 530 between the pole tip and yoke portions. In this method, composite core 520 is formed according to following steps:

(1) As shown in FIG. 11A, build a composite pole according to either of the above methods, or any other comparable method, wherein the composite pole has a pole tip portion 522 and a yoke portion 524;

(2) As shown in FIG. 11B, apply mill-mask 526 which defines a pole width such that a height of pole tip portion 528 includes both material forming pole tip portion 522 and material forming yoke portion 524;

(3) As shown in FIG. 11C, mill structure to leave composite pole 520 having flux regulating interface 530 in pole tip region 528;

(4) As shown in FIG. 11D, strip mill-mask 526 and lap air bearing surface ABS of composite pole 520 to define a height of pole tip portion 528 and to define the location of flux regulating interface 530 along the height of pole tip portion 528.

In summary, the composite core of the transducing head of the present invention incorporates a substantially planar top pole formed of a high magnetic moment material at a pole tip region while a remainder of the top pole is formed of a high resistivity material. This composition of the top pole allows for a reduction of eddy current effects in the transducing head, as well as an increase in write gap field strength of the transducing head. Thus the transducing head of the present invention will have an increased potential aerial density and improved potential frequency response over prior art transducing heads.

Although the present invention has been described with reference to preferred embodiments, workers skilled in the art will recognize that changes may be made in form and detail without departing from the spirit and scope of the invention.

What is claimed is:

1. A magnetic data storage and retrieval system comprising:

a transducing head comprising a bottom shield, a shared pole, a read element positioned between the bottom shield and the shared pole, and a conductive coil positioned on a side of the shared pole opposite the read element; and composite top pole means for minimizing eddy current effects in the transducing head while increasing write gap field strength of the transducing head.

2. The magnetic data storage and retrieval system of claim 1 wherein the shared pole is a recessed shared pole comprising:

a substantially planar first portion;

a second portion positioned on the first portion adjacent an air bearing surface of the transducing head; and a third portion positioned on the first portion opposite the air bearing surface, wherein a U-shaped cavity is formed above the first portion between the second portion and the third portion, and wherein a thickness of the third portion is greater than a thickness of the second portion such that the third portion is in contact with the top pole and the second portion is separated from the top pole by the write gap.

3. The magnetic data storage and retrieval system of claim 2 wherein at least a portion of the conductive coil is positioned in the U-shaped cavity of the shared pole.

4. The magnetic data storage and retrieval system of claim 3 wherein at least a portion of the conductive coil is encapsulated in an insulating material.

5. The magnetic data storage and retrieval system of claim 1 wherein the composite top pole means is substantially planar.

6. The magnetic data storage and retrieval system of claim 5 wherein the composite top pole means is formed of a high magnetic pole tip portion adjacent an air bearing surface of the transducing head and a high resistivity yoke portion opposite the air bearing surface.

7. The magnetic data storage and retrieval system of claim 6 wherein the pole tip portion of the composite top pole means is substantially coplanar with the yoke portion of the composite top pole means.

8. A magnetic transducing head having an air bearing surface and comprising:

a bottom shield;

a shared pole;

a read element positioned between the bottom shield and the shared pole;

a substantially planar composite top pole formed of high magnetic moment pole tip portion and a high resistivity yoke portion, the pole tip portion being substantially coplanar with the yoke portion, wherein the pole tip portion is separated from the shared pole at the air bearing surface by a write gap, and wherein the yoke portion is in contact with the shared pole opposite the air bearing surface; and a conductive coil positioned such that at least a portion of the conductive coil is positioned between the shared pole and the top pole.

9. The magnetic transducing head of claim 8 wherein the shared pole is a recessed shared pole comprising:

a substantially planar first portion;

a second portion positioned on the first portion adjacent the air bearing surface; and a third portion positioned on the first portion opposite the air bearing surface, wherein a U-shaped cavity is formed above the first portion between the second portion and the third portion, and wherein a thickness of the third portion is greater than a thickness of the second portion such that the third portion is in contact with the top pole and the second portion is separated from the top pole by the write gap.

10. The magnetic transducing head of claim 9 wherein at least a portion of the conductive coil is positioned in the U-shaped cavity of the shared pole.

11. The magnetic transducing head of claim 10 wherein the conductive coils are encapsulated in an insulating material.

12. A magnetic transducing head having an air bearing surface and comprising:

a bottom shield;

a shared pole;

first half gap positioned adjacent the bottom shield between the bottom shield and the shared pole;

a second half gap positioned adjacent the shared pole between the bottom shield and the shared pole;

a read element positioned adjacent the air bearing surface between the first and second half gaps;

a substantially planar composite top pole formed of a high magnetic moment pole tip portion and a high resistivity yoke portion, the pole tip portion being substantially coplanar with the yoke portion;

a write gap layer positioned such that the pole tip portion of the top pole is separated from the shared pole at the air bearing surface by the write gap layer and such that the yoke portion of the top pole is in contact with the shared pole opposite the air bearing surface;

a conductive coil positioned such that at least a portion of the conductive coil is positioned between the shared pole and the top pole;

insulating layers positioned between the shared pole and the top pole to electrically insulate the conductive coil from each of the shared pole and the top pole.

13. The magnetic transducing head of claim 12 wherein the shared pole is a recessed shared pole comprising:

a substantially planar first portion;

a second portion positioned on the yoke portion adjacent the air bearing surface; and a third portion positioned on the yoke portion opposite the air bearing surface, wherein a U-shaped cavity is formed above the yoke portion between the pole tip portion and the back via portion, and wherein a thickness of the back via portion is greater than a thickness of the pole tip portion such that the back via portion is in contact with the top pole and the pole tip portion is separated from the top pole by the write gap.

14. The magnetic transducing head of claim 13 wherein at least a portion of the conductive coil is positioned in the U-shaped cavity of the shared pole.

* * * * *